United States Patent
Jeon

(10) Patent No.: US 7,682,734 B2
(45) Date of Patent: Mar. 23, 2010

(54) RECHARGEABLE BATTERY HAVING PLIABLE CELL AND MANUFACTURING METHOD THEREOF

(75) Inventor: Hyung-Woo Jeon, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 700 days.

(21) Appl. No.: 11/066,814

(22) Filed: Feb. 25, 2005

(65) Prior Publication Data

US 2005/0191546 A1    Sep. 1, 2005

(30) Foreign Application Priority Data

Feb. 28, 2004    (KR) ................. 10-2004-0013807

(51) Int. Cl.
*H01M 2/00* (2006.01)
*H01M 2/08* (2006.01)
(52) U.S. Cl. ..................... 429/163; 429/175
(58) Field of Classification Search ............... 439/569, 439/500, 573
See application file for complete search history.

(56) References Cited

U.S. PATENT DOCUMENTS

| 6,660,433 B2 * | 12/2003 | Watanabe et al. ...... 429/231.95 |
| 6,881,371 B2 * | 4/2005 | Iwaizono et al. ............ 264/261 |
| 2003/0165736 A1 * | 9/2003 | Hiratsuka ................... 429/153 |
| 2004/0029001 A1 * | 2/2004 | Yamazaki et al. ........... 429/176 |
| 2004/0131935 A1 * | 7/2004 | Munenaga et al. .......... 429/211 |

FOREIGN PATENT DOCUMENTS

| JP | 2000-315483 | 11/2000 |
| JP | 2003-022789 | 1/2003 |
| JP | 2003-077434 | 3/2003 |
| JP | 2003-077436 | 3/2003 |
| KR | 10 2003 0066380 A | 1/2003 |
| WO | WO 02/33766 | * 4/2002 |

* cited by examiner

*Primary Examiner*—Dah-Wei D Yuan
*Assistant Examiner*—Maria J Laios
(74) *Attorney, Agent, or Firm*—Lee, Hong, Degerman, Kang & Waimey

(57) ABSTRACT

A rechargeable battery having a compact size and improved strength comprises a case, a battery cell, a circuit board and a covering member. The case has an internal space and an open end. The battery cell is made of a pliable material and is installed within the case, wherein a surface of the battery cell is electrically connected to the circuit board at the open end of the case. The covering member hermetically seals the open end of the case. Accordingly, the battery has a compact size, improved strength and may be manufactured easily.

24 Claims, 2 Drawing Sheets

RECHARGEABLE BATTERY HAVING PLIABLE CELL AND MANUFACTURING METHOD THEREOF

CROSS-REFERENCE TO RELATED APPLICATIONS

Pursuant to 35 U.S.C. §119(a), this application claims the benefit of earlier filing date and right of priority to Korean Application No. 10-2004-13807, filed on Feb. 28, 2004, the contents of which is hereby incorporated by reference herein in its entirety.

BACKGROUND OF THE INVENTION

1. Field of the Invention

The present invention relates to a rechargeable battery having a pliable cell, and more particularly, to a rechargeable battery having a pliable cell having a compact size and improved strength for withstanding an external impact.

2. Description of the Related Art

Recently, with the significant development of portable electronic equipment, many types of secondary batteries, capable of being repetitively discharged and recharged, are increasingly used. Accordingly, these types of batteries have rapidly improved with regard to performance and life span. Among the many types of secondary batteries, a rechargeable battery having a battery cell using a pliable gel electrolyte is drawing much attention. An example of such a battery is a lithium polymer battery, which has a long life span, high reliability and good transformability. Generally, such a rechargeable battery is constructed by housing a pliable battery cell, an electric circuit and other related components within a case made of a strong material in order to protect the components from an external impact.

As portable electronic equipment have developed, they have become smaller in size and lighter in weight. Furthermore, the equipment has been manufactured into a variety of shapes. Accordingly, rechargeable batteries for use in the portable electronic equipment should also be small in size, light in weight and be manufactured into a variety of shapes. Moreover, the external case of the rechargeable battery should be able to protect the battery cell while having a compact size so as not to increase the overall size of the battery. The case's structure should also be uncomplicated so that manufacturing of the case is simple, fast and reliable.

SUMMARY OF THE INVENTION

The present invention is directed to a rechargeable battery having a pliable cell. The rechargeable battery has a compact size and improved strength for withstanding an external impact.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a rechargeable battery comprising a case having an internal space and an open end, a battery cell installed within the case, the battery cell made of pliable material and having a surface electrically connected to a circuit board at the open end of the case, and a covering member for hermetically sealing the open end of the case is provided.

In accordance with one aspect of the present invention, the covering member at least partially encapsulates the circuit board to allow an external terminal of the circuit board to be externally exposed. The case is formed to fit an exterior of the battery cell. Preferably, the case has monolithic construction and comprises a strong and lightweight material, such as aluminum or stainless steel.

Preferably, the covering member is injection molded to the open end of the case, wherein the covering member is injection molded at a low temperature and pressure, and is formed between an inner portion of the case and the circuit board. Furthermore, the covering member is formed such that a surface of the covering member is a predetermined distance away from the battery cell. The covering member may be formed of a material such as a nylon-based resin.

In accordance with another aspect of the present invention, the battery cell has a gel electrolyte and the rechargeable battery may be a lithium polymer battery. Moreover, the circuit board may be located a predetermined distance away from, and on the outer side of, the open end of the case.

In another embodiment, a method for manufacturing a rechargeable battery is provided. The method comprises installing a battery cell within a case, wherein the case has an internal space and an open end and the battery cell is made of pliable material, electrically connecting a surface of the battery cell to a circuit board at the open end of the case, and hermetically sealing the open end of the case with a covering member.

In accordance with one aspect of the present invention, the covering member at least partially encapsulates the circuit board to allow an external terminal of the circuit board to be externally exposed. The case is formed to fit an exterior of the battery cell. Preferably, the case has monolithic construction and comprises a strong and lightweight material, such as aluminum or stainless steel.

Preferably, the covering member is injection molded to the open end of the case, wherein the covering member is injection molded at a low temperature and pressure, and is formed between an inner portion of the case and the circuit board. Furthermore, the covering member is formed such that a surface of the covering member is a predetermined distance away from the battery cell. The covering member may be formed of a material such as a nylon-based resin.

In accordance with another embodiment, the battery cell has a gel electrolyte and the rechargeable battery may be a lithium polymer battery. Moreover, the circuit board may be located a predetermined distance away from, and on the outer side of, the open end of the case.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
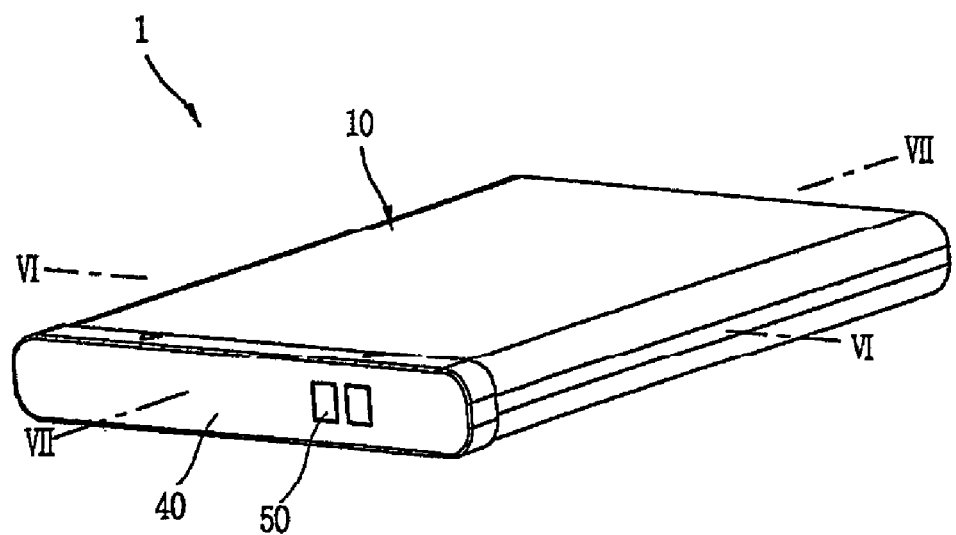
FIG. 1 is a perspective view of a rechargeable battery having a pliable cell in accordance with one embodiment of the present invention.

Referring to FIGS. 1-4, in accordance with one embodiment of the present invention, a rechargeable battery 1 comprises a case 10 having an internal space and an open end. A battery cell 20 is housed within the case 10. Preferably, the battery cell 20 is made of a pliable material and has a surface electrically connected to a circuit board 30 positioned at the open end of the case 10. The circuit board 30 is located on the outer side of the case 10 and comprises an external terminal 50.

Figure 2:
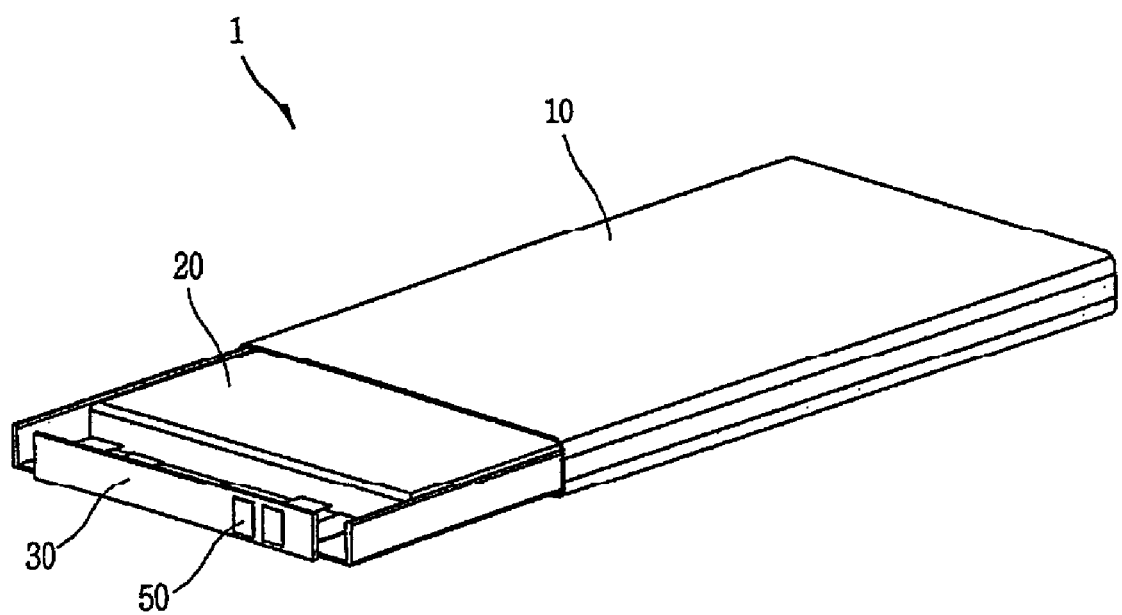
FIG. 2 is a perspective view of a rechargeable battery having a pliable cell as partially removed from a covering member in accordance with one embodiment of the present invention.
Figure 3:
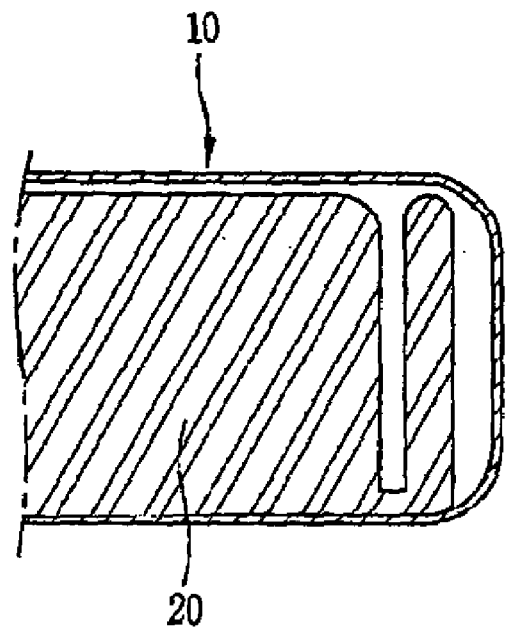
FIG. 3 is a partial longitudinal sectional view along line VI-VI of the rechargeable battery of FIG. 1.
Figure 4:
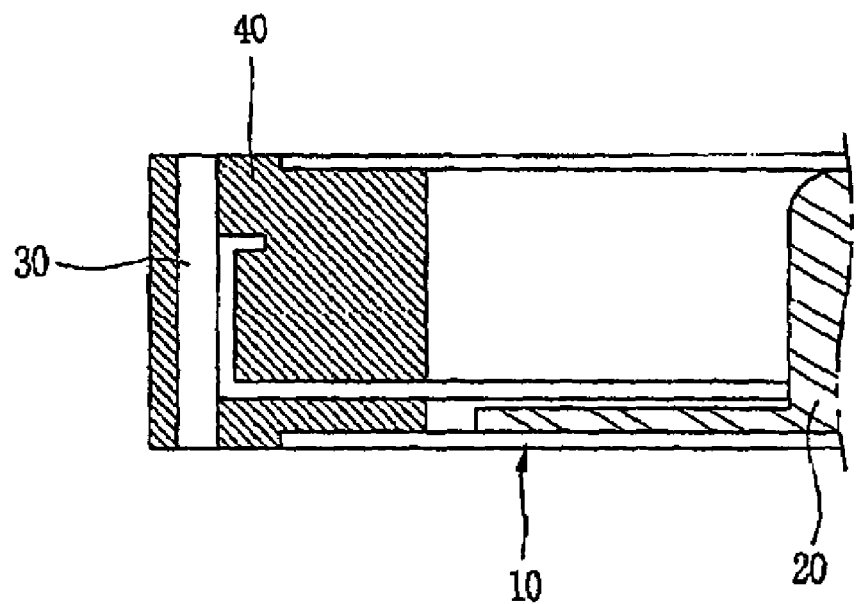
FIG. 4 is a partial longitudinal sectional view along line VII-VII of the rechargeable battery of FIG. 1.

The circuit board 30 further comprises a protection circuit for protecting against electrical damage due to overcharging or overdischarging of the rechargeable battery, a power terminal and an ID pattern terminal (not shown in FIG. 2). The rechargeable battery 1 further comprises a covering member 40, as shown in FIG. 4, for hermetically sealing the open end of the case 10. The covering member 40 encompasses the circuit board 30 while allowing the external terminal 50 to be externally exposed.

Preferably, the case 10 is formed to fit an exterior of the pliable battery cell 20. Thus, if the battery cell 20 has a rectangular parallelepiped shape, as shown in FIG. 2, then the case 10 also has a rectangular parallelepiped shape. Furthermore, an end of the case 10 is open so that the battery cell 20 can be inserted into the case 10. Preferably, the case 10 has monolithic construction to strengthen the case 10 and simplify the assembly of the rechargeable battery 1. Moreover, the case 10 is made of a strong and lightweight material, such as aluminum or stainless steel, to provide protection against an external impact and corrosion.

The circuit board 30 is removably coupled to the open end of the case 10 when the battery cell 20 is inserted into the case 10. In order to firmly couple the covering member 40 to the rechargeable battery 1, the covering member 40 may be injection molded to the open end of the case 10, wherein the injected molded covering member 40 at least partially encloses on encapsulates the circuit board 30 within in an air-tight manner. Preferably, the covering member 40 is molded such that the battery cell 20 connected to the circuit board 30 is hermetically sealed in the case 10 and the external terminal 50 of the circuit board 30 is exposed from the open end of the case 10.

Referring to FIG. 4, the covering member 40 is injection molded to the inside of the open end of the case 10. Accordingly, the circuit board 30 is preferably located a predetermined distance away from the case 10 and protrudes outwardly from the case 10 so as not to block the open end of the case 10. Additionally, the covering member 40 is injection molded such that a surface of the covering member 40 nearest the battery cell 20 maintains a predetermined distance away from the battery cell 20.

In one embodiment, the covering member 40 is made of a nylon-based resin and is injection molded at a relatively low temperature and pressure so that no damage is caused to any of the internal elements of the rechargeable battery 1, such as the circuit board 30. While injection molding is preferred, it is contemplated that the covering member 40 may seal the open end of the case 10 by other methods known in the art.

In accordance with one aspect of the present invention, the structure of the rechargeable battery 1 may be employed for a battery, such as a lithium polymer battery, having a gel electrolyte as a separator of the battery cell 20.

Additionally, although not shown in the figures, a hole with a predetermined shaped may be formed on the case 10 at a surface opposite the open end of the case 10 to expose the external terminal 50 of the circuit board 30. Accordingly, the battery cell 20 may be inserted in the case 10, making the circuit board 30 meet the surface of the case 10 where the hole is formed. The open end of the case 10 may then be covered by injection molding the covering member 40.

In another embodiment of the present invention, a method for manufacturing a rechargeable battery is provided. The method comprises installing a battery cell 20 within a case 10. Preferably, the case 10 has an internal space and an open end. Also, the battery cell 20 is made of a pliable material. A surface of the battery cell 20 is electrically connected to a circuit board 30 at the open end of the case. After, the open end of the case is hermetically sealed with a covering member.

The covering member 40 is formed on the open end of the case by an injection molding method; thus, the process is performed in a simple and speedy manner, and the reliability of the covering member is remarkably improved. Also, when the covering member 40 is formed using the injection molding method, the molding is performed at a relatively low temperature and pressure, such as below 20° C. and 40 bar. This is preferable so that internal parts of the battery, such as the battery cell 20 and the circuit board 30, may be protected from damage when forming the covering member 40.

Furthermore, the covering member 40 is injection molded a predetermined distance away from the battery cell 20. This also serves to protect internal parts of the battery from damage. Preferably, the covering member 40 is injection molded to the inside of the case 10 so as not to be separated from the case 10 when the battery suffers an external impact.

The injection molded covering member 40 is preferably made of a nylon-based resin; however, the covering member may be made of other materials capable of being injection molded in accordance with other aspects of the invention. In order to facilitate the covering member 40 being injection molded up to the inside of the case 10, the battery cell 20 is preferably installed inside the case 10 with the circuit board 30 exposed outside the case 10. The case 10 is preferably made of aluminum or stainless steel but may also be made of other materials having good formability and high strength.

In one embodiment of the present invention, the rechargeable battery assembled by the above-described manufacturing method is used for a battery, such as a lithium polymer battery, having a gel electrolyte as a separator of the battery cell 20.

As so far described, in the rechargeable battery having a pliable cell according to the present invention, a battery cell made of a pliable material and connected to a circuit board is inserted into a case. An open end of the case is sealed by a covering member. The covering member is injection molded at a low temperature and pressure so that the exterior of the battery can strongly endure an external impact while having a simple structure.

Additionally, because a process for forming the exterior of the battery is simple, measurement precision is high and defection proportion decreases. Accordingly, fabrication costs are reduced.

Moreover, by completely sealing the open end of the case with the covering member, the exterior of the battery can endure against water or moisture. Also, label printing or laser printing may be performed on the exterior, thus allowing the exterior to be more aesthetically pleasing.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rechargeable battery comprising:
a case having an internal space and an open end;
a battery cell installed within the case, the battery cell made of pliable material and having a surface electrically connected to a circuit board at the open end of the case; and
a covering member for hermetically sealing the open end of the case, the covering member enveloping said surface of the battery cell electrically connected to the circuit board,
wherein the covering member is injection molded to the open end of the case including an inner surface of the case, such than an air gap is formed between an inner surface of the covering member and the battery cell with a predetermined distance,
and wherein the circuit board is installed at an interval from the case and protrudes outside the case such that the circuit board does not block the open end of the case during the injection molding process.

2. The rechargeable battery of claim 1, wherein the covering member at least partially encapsulates the circuit board to allow an external terminal of the circuit board to be externally exposed.

3. The rechargeable battery of claim 1, wherein the case is formed to fit an exterior of the battery cell.

4. The rechargeable battery of claim 1, wherein the case has monolithic construction.

5. The rechargeable battery of claim 1, wherein the case comprises a strong and lightweight material.

6. The rechargeable battery of claim 5, wherein the case comprises at least one of aluminum and stainless steel.

7. The rechargeable battery of claim 1, wherein the covering member is injection molded at a temperature below 20° C. and a pressure below 40 bar.

8. The rechargeable battery of claim 1, wherein the covering member is formed between the inner surface of the case and the circuit board.

9. The rechargeable battery of claim 1, wherein the covering member comprises a nylon-based resin.

10. The rechargeable battery of claim 1, wherein the battery cell has a gel electrolyte.

11. The rechargeable battery of claim 1, wherein the rechargeable battery is a lithium polymer battery.

12. A method for manufacturing a rechargeable battery, the method comprising:
installing a battery cell within a case, wherein the case has an internal space and an open end and the battery cell is made of pliable material;
electrically connecting a surface of the battery cell to a circuit board at the open end of the case; and
hermetically sealing the open end of the case with a covering member such that said surface of the battery cell electrically connected to the circuit board is enveloped by the covering member,
wherein the covering member is injection molded to the open end of the case including an inner surface of the case, such that an air gap is formed between an inner surface of the covering member and the battery cell with a predetermined distance, and
wherein the circuit board is installed at an interval from the case and protrudes outside the case such that the circuit board does not block the open end of the case during the injection molding process.

13. The method of claim 12, wherein the covering member at least partially encapsulates the circuit board to allow an external terminal of the circuit board to be externally exposed.

14. The method of claim 12, wherein the case is formed to fit an exterior of the battery cell.

15. The method of claim 12, wherein the case has monolithic construction.

16. The method of claim 12, wherein the case comprises a strong and lightweight material.

17. The method of claim 16 wherein the case comprises at least one of aluminum and stainless steel.

18. The method of claim 12, wherein the covering member is injection molded at a temperature below 20° C. and a pressure below 40 bar.

19. The method of claim 12, wherein the covering member is formed between the inner portion of the case and the circuit board.

20. The method of claim 12, wherein the covering member comprises a nylon-based resin.

21. The method of claim 12, wherein the battery cell has a gel electrolyte.

22. The method of claim 12, wherein the rechargeable battery is a lithium polymer battery.

23. A rechargeable battery comprising:
a case having an internal space and an open end;
a battery cell installed within the case, the battery cell made of pliable material and having a surface electrically connected to a circuit board at the open end of the case; and
a covering member for hermetically sealing the open end of the case, the covering member enveloping said surface of the battery cell electrically connected to the circuit board,
wherein the covering member is injection molded to the open end of the case including an inner surface of the case, such that an air gap is formed between an inner surface of the covering member and the battery cell with a predetermined distance, and wherein the covering member is formed both inside of the circuit board and outside of the circuit board, and
wherein the circuit board is installed at an interval from the case and protrudes outside the case such that the circuit board does not block the open end of the case during the injection molding process.

24. A method for manufacturing a rechargeable battery, the method comprising:
installing a battery cell within a case, wherein the case has an internal space and an open end and the battery cell is made of pliable material;
electrically connecting a surface of the battery cell to a circuit board at the open end of the case; and
hermetically sealing the open end of the case with a covering member such that said surface of the battery cell electrically connected to the circuit board is enveloped by the covering member, wherein the covering member is injection molded to the open end of the case including an inner surface of the case, such that an air gap is formed between an inner surface of the covering member and the battery cell with a predetermined distance, and wherein the covering member is formed both inside of the circuit board and outside of the circuit board, and wherein the circuit board is installed at an interval from the case and protrudes outside the case such that the circuit board does not block the open end of the case during the injection molding process.

* * * * *